INVENTOR.
RAY F. THORNTON
BY
KOTTS & SHERIDAN
ATTORNEYS

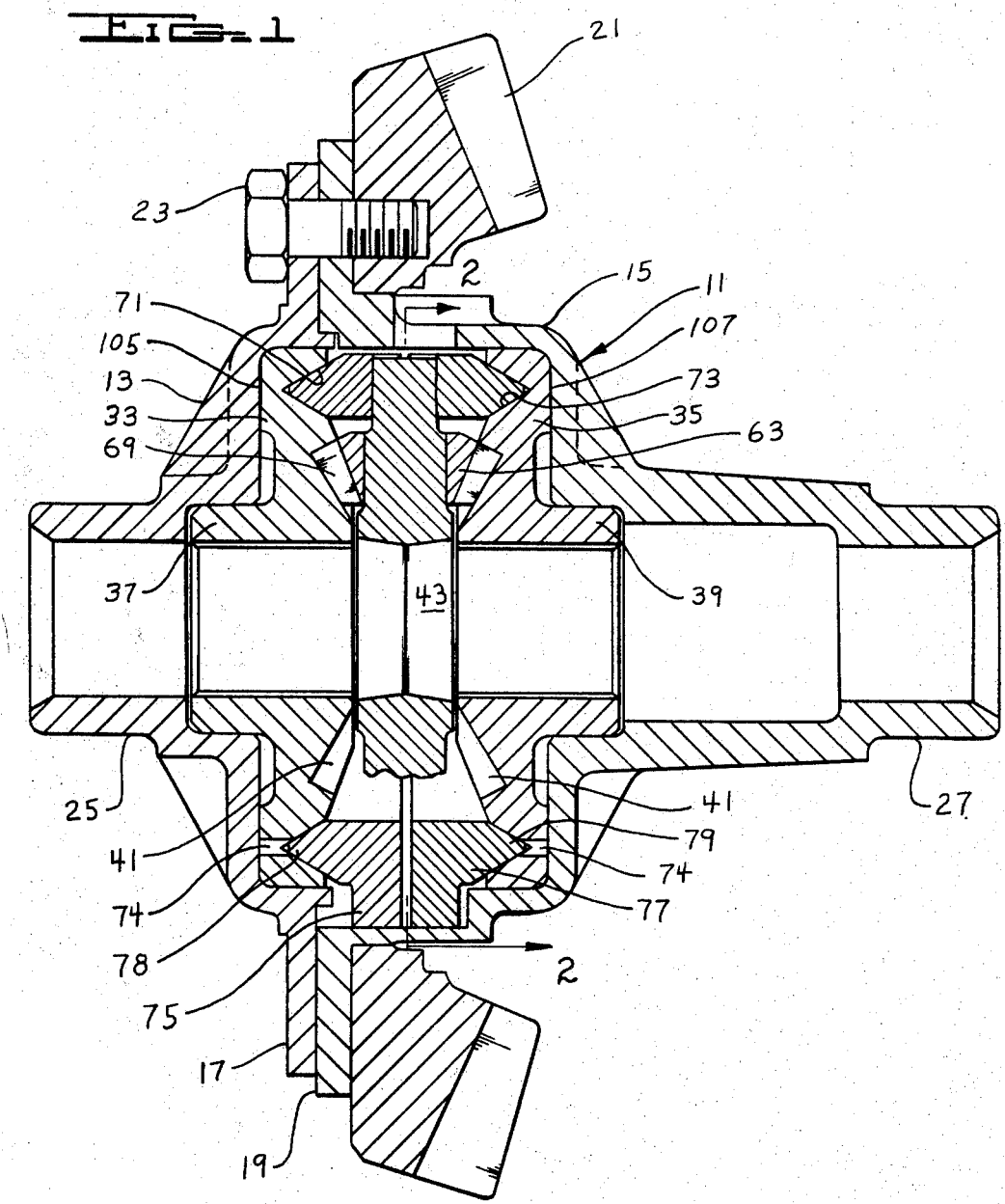

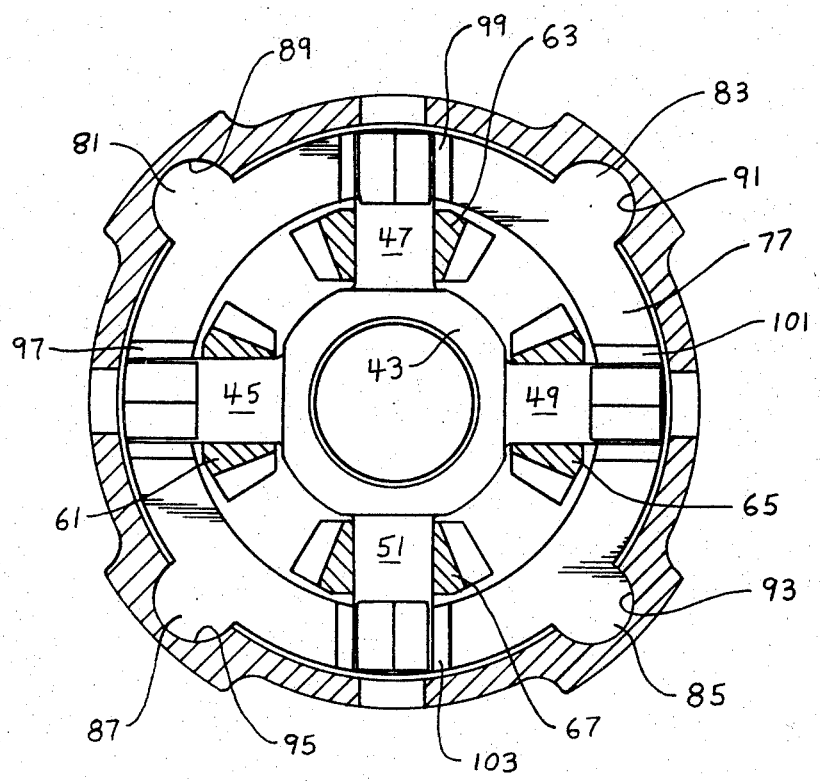
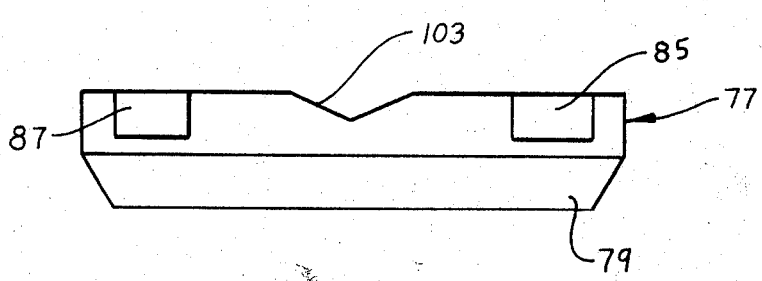

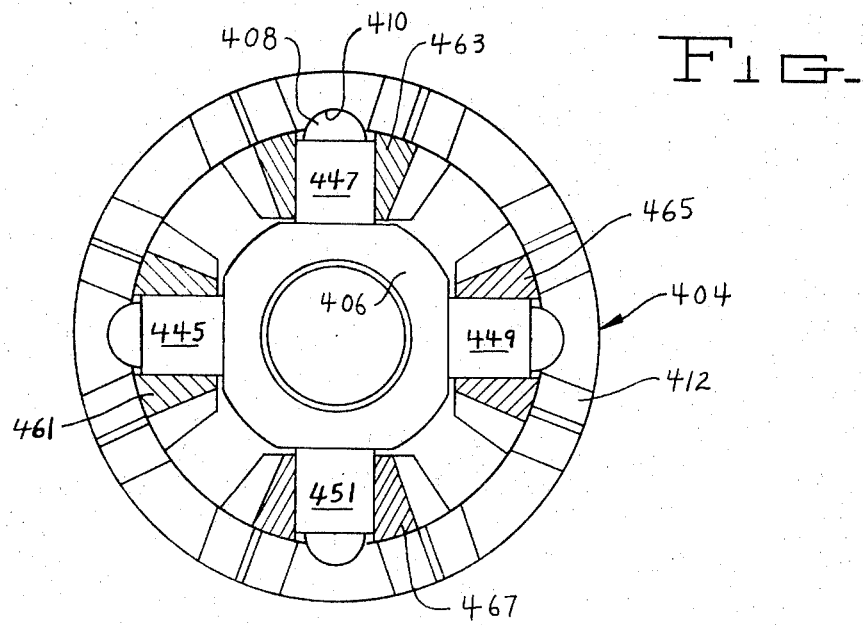
FIG_13
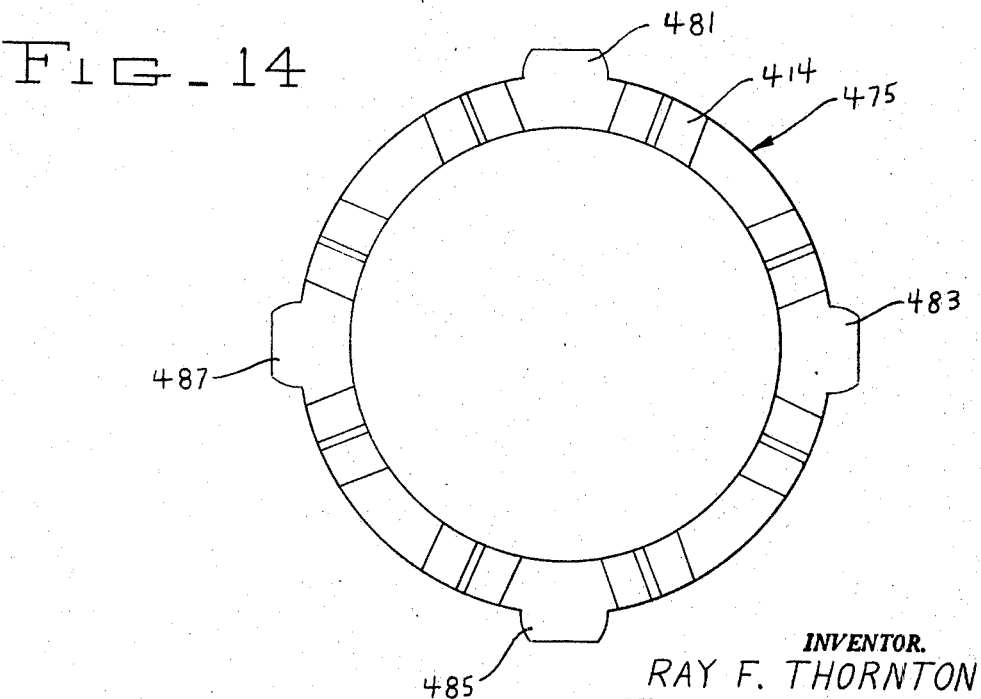
FIG_14

United States Patent Office 3,438,282
Patented Apr. 15, 1969

3,438,282
LOCKING DIFFERENTIAL
Ray F. Thornton, 8735 Jackson Road,
Dexter, Mich. 48130
Continuation-in-part of application Ser. No. 19,358,
Apr. 1, 1960. This application Feb. 26, 1962, Ser.
No. 176,870
Int. Cl. F16h *1/44*
U.S. Cl. 74—711                      12 Claims The present invention relates to improvements in a locking differential construction, and is a continuation-in-part of application Ser. No. 19,358 filed Apr. 1, 1960, now abandoned.

Although a locking differential has many possible uses, one of the principal uses is in the driving axle of a wheeled vehicle. When so used, it is the objective of the locking differential to provide maximum driving power to the wheels with the elimination of wheel spin when one wheel is under low traction. Such a unit must also provide differential action when the vehicle turns a corner.

The description herein will discuss the use of the locking differential in a wheeled vehicle, but it is to be recognized that other usages exist.

It is an object of the present invention to provide a locking differential construction which can be manufactured in small sizes while still providing efficient function.

It is another object of the present invention to provide such a locking differential which is simple in construction and adapted to low cost manufacture.

It is a further object of the present invention to provide a locking differential which has a long, trouble-free service life.

It is another object to provide a locking differential which quickly and effectively relieves the locking pressure when differentialing is required.

It is a further object to provide a locking differential which eliminates fade and drag to an optimum point; which minimizes noise and chatter; and which provides maximum lock and unlock.

Other objects of this invention will appear in the following description and appended claims, reference being had to the accompanying drawings forming a part of this specification wherein like reference characters designate corresponding parts in the several views.

In the drawings:

FIG. 1 is a rear mid-sectional elevation of a differential according to the first embodiment of the present invention.

FIG. 2 is a sectional elevation taken along the line 2—2 in the direction of the arrows, FIG. 1.

FIG. 3 is a side view of one of the pressure rings.

FIG. 13 is a side elevation showing the spider assembly used with the fourth embodiment.

FIG. 14 is a side elevation of one of the pressure rings used in the fourth embodiment.

Figure 4:
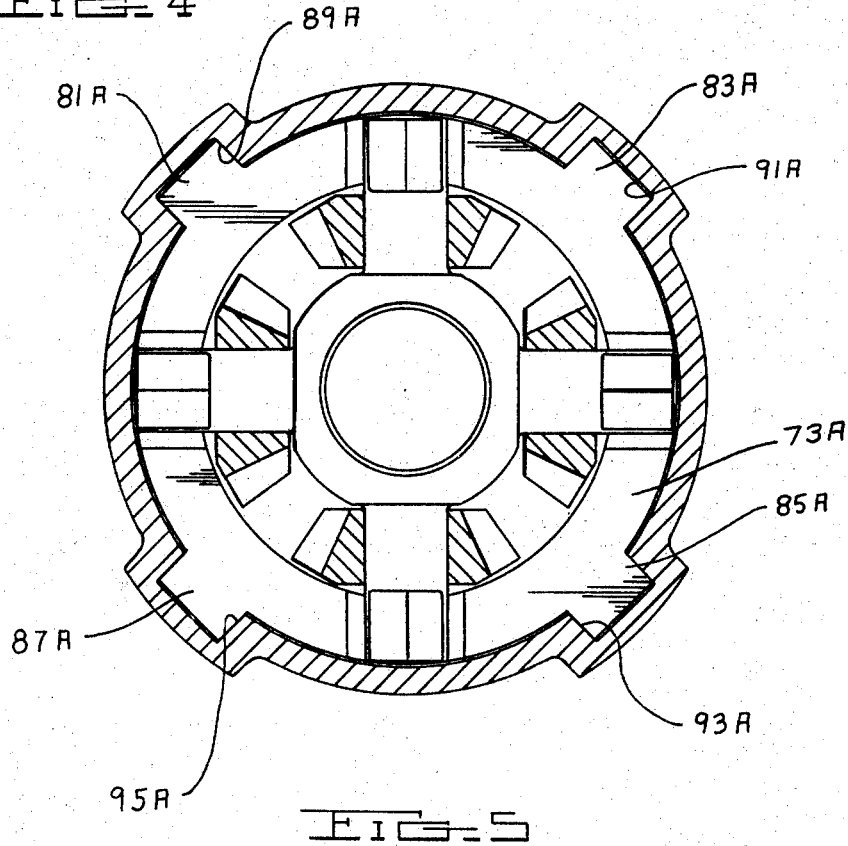
FIG. 4 is a view similar to FIG. 2, showing a modification using squared pressure ring bosses.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed therein is for the purpose of description and not of limitation.

Referring generally to FIGS. 1–3 and 6 of the drawings, a case 11 is provided which includes case sections 13 and 15. The case section 13 has a flange 17 which is positioned adjacent a flange 19 on case section 15. A ring gear 21 is affixed to flanges 17 and 19 with bolts 23, and the same bolts hold case sections 13 and 15 together. The ring gear 21 engages a drive pinion (not shown) in conventional fashion. The drive pinion is coupled to a power source through the usual drive line.

Bearing hubs 25 and 27 are provided on the case sections for seating the usual bearings.

Side gears 33 and 35 are provided in the unit with their flat backs 105 and 107 adjacent the differential case. In this manner, the ends of the case 11 act as thrust washers for the side gears. The hubs 37 and 39 of the side gears are journalled in the case sections 13 and 15. The side gears are provided with bevel teeth 41. The central openings in the side gears are splined so that they will engage the splined ends of axle shafts. The splines are not shown in detail for the sake of simplicity.

A spider 43 is provided between side gears 33 and 35. The spider has four radially extending pins 45, 47, 49 and 51. Each spider pin has cam faces such as cam faces 53, 55, 57 and 59 (FIG. 6) which converge toward opposite sides of the pin 47. The pinion gears 61, 63, 65 and 67 are disposed one over each spider pin. These pinion gears have bevel teeth 69 which engage the teeth 41 in the side gears. Side gear 33 is provided with a V-shaped groove 71, and side gear 35 is provided with a V-shaped groove 73. These grooves are on the face of the gears above the gear teeth. Several holes 74 are provided at the base of the grooves 71 and 73 (FIG. 1) to accommodate oil, and eliminate hydraulic pressure in the grooves, which hydraulic pressure might prevent an effective lock.

A pair of pressure rings 75, 77 are disposed one between each side gear and the spider pin. FIGS. 1, 2 and 3 show the pressure ring 77 in detail, and it is to be understood that the pressure ring 75 is identical. The outer face of the pressure ring 77 includes the tapered annular boss 79 which is adapted to fit into the V-shaped groove 73 in side gear 35. The pressure ring 77 also includes four bosses 81, 83, 85 and 87 (FIG. 2) which closely fit into grooves 89, 91, 93 and 95 in the case 11. Thus, the pressure rings 75 and 77 are rotatable with the case.

The inner side of the ring includes four cam surfaces indicated at 97, 99, 101 and 103. These cam surfaces are adapted to mate with the cam faces on the spider pins. Eight cam surfaces are provided for forward lock, and eight are provided for rearward lock. A balanced lock is provided, and there is equal pressure distribution on the pressure rings.

*Operation*

When power is applied from the power source through the drive line to rotate the differential case 11, the case is moved forward slightly in the rotational direction with respect to the spider 43. The pressure rings 75 and 77 are carried with the case 11 since they are engaged with the case through the bosses such as bosses 81, 83, 85 and 87 on pressure ring 77 (FIG. 2). The cam surfaces, such as 97, 99, 101 and 103 on pressure ring 77, move into pressure engagement against the cam faces on the spider pins, and there is an outward component of force through the pressure rings toward each side of the case 11. This action moves the wedges 78 and 79 on the pressure rings 75 and 77 into pressure engagement with the grooves 71 and 73 in the side gears 33 and 35. Pressure is thus exerted between the backs 105 and 107 of the side gears and the ends of the case 11 so that the gearing is effectively locked to the case and cannot provide planetary action. During this action, the gearing does not spread.

When differential action is required, as when the vehicle turns a corner and one wheel rotates faster than the other, it is instantly and effectively provided, since the gearing does not spread but remains constant without backlash. We will assume that the vehicle is making a left turn in FIG. 1. The outside wheel in the turn rotates the side gear 35 faster than the side gear 33 which is affixed to the inside wheel of the turn. The outside or right wheel picks up to a rotation of one and one-half times as fast as the case rotation, and the inside or left wheel slows down to a rotation of one-half as fast as the case rotation This action relieves the pressure between the spider pin cams and the cam surfaces on the pressure rings by advancing the spider to the neutral position. Such action relieves the pressure between the wedges of the pressure rings and the grooves of the side gears, and the locking pressure between the backs 105 and 107 of the side gears and the ends of the differential case 11 is removed. In this neutral condition, the unit can perform effective differential function, and there is no tendency toward false lock. However, if one wheel in the turn hits a low traction surface, it will not spin because any such tendency will again cause the unit to lock.

Locking and unlocking is normally provided with approximately three to five thousandths relative movement between the spider and pressure rings.

The construction of the present invention provides adequate lock area and pressure to accomplish a very effective lock, while affording a quick and effective release of the lock when differential action is required. All cam engagements are substantially zeroed out with minimum backlash. The locking and unlocking is accomplished with only a few thousandths movement. The gear teeth are substantially zeroed out so that there is minimum backlash.

Figure 5:
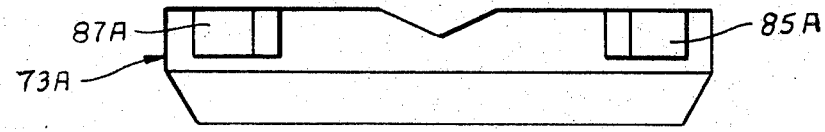
FIG. 5 is a view similar to FIG. 3, showing the pressure ring used with the construction of FIG. 4.
Figure 6:
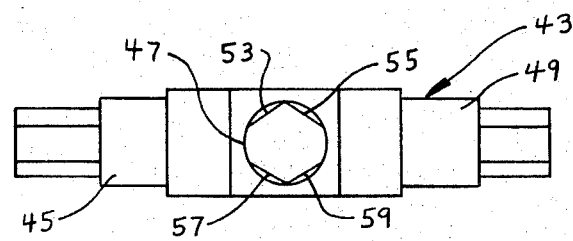
FIG. 6 is a top view of the spider used with the first embodiment.

FIGS. 4 and 5 of the drawings illustrate a modification wherein the bosses 81A, 83A, 85A and 87A of the pressure rings, such as ring 73A, are squared and fit into squared passages 89A, 91A, 93A, and 95A in the case. In all other respects the construciton is the same.

Figure 7:
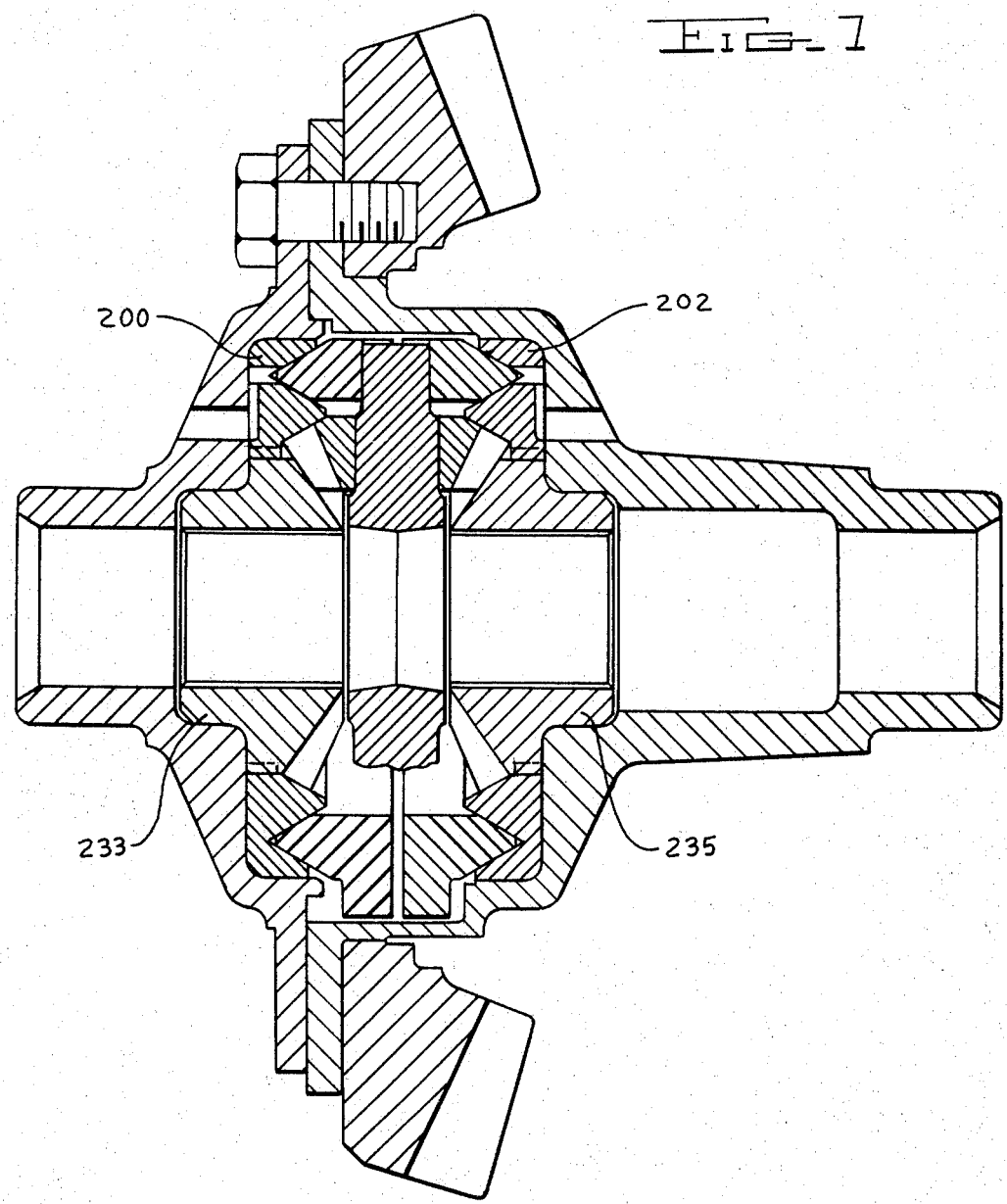
FIG. 7 is a rear mid-sectional elevation of a differential showing the second embodiment of the present invention which uses a two piece locking ring and side gear assembly.

Another embodiment of the present invention is shown in FIG. 7 of the drawings. In this embodiment a side gear and separate locking ring are used rather than placing the locking grooves in the faces of the side gears.

The locking rings 200 and 202 fit over side gears 233 and 235 which are formed with conventional bevel gear teeth. This two piece construction permits the side gears to be cut on conventional gear cutting equipment. Of course, the pinions are also bevel gear construction. Otherwise, the construction is generally similar to the embodiment shown in FIGS. 1–3 of the drawings.

Figure 8:
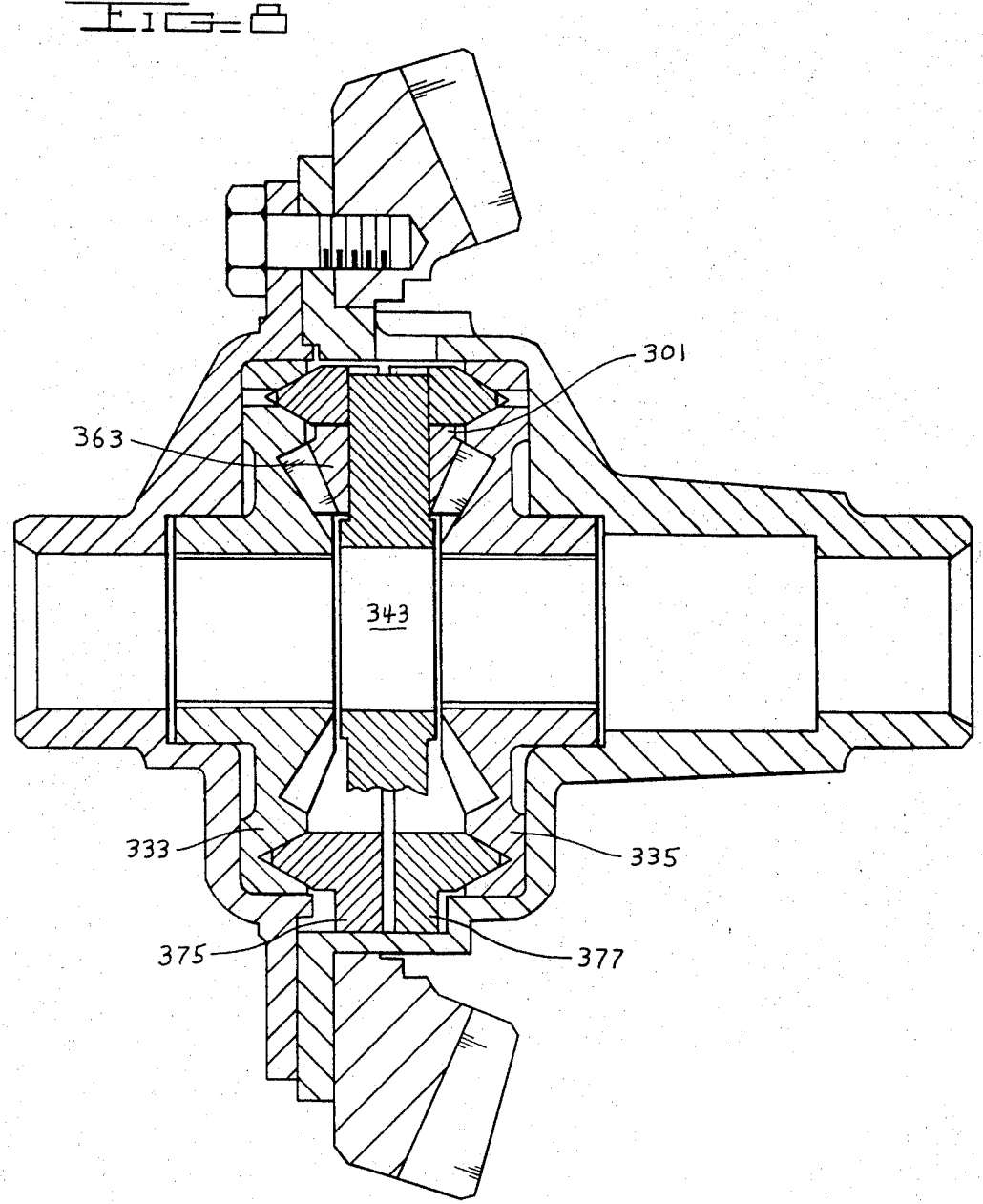
FIG. 8 is a rear mid-sectional elevation of a differential showing the third embodiment of the present invention.
Figure 9:
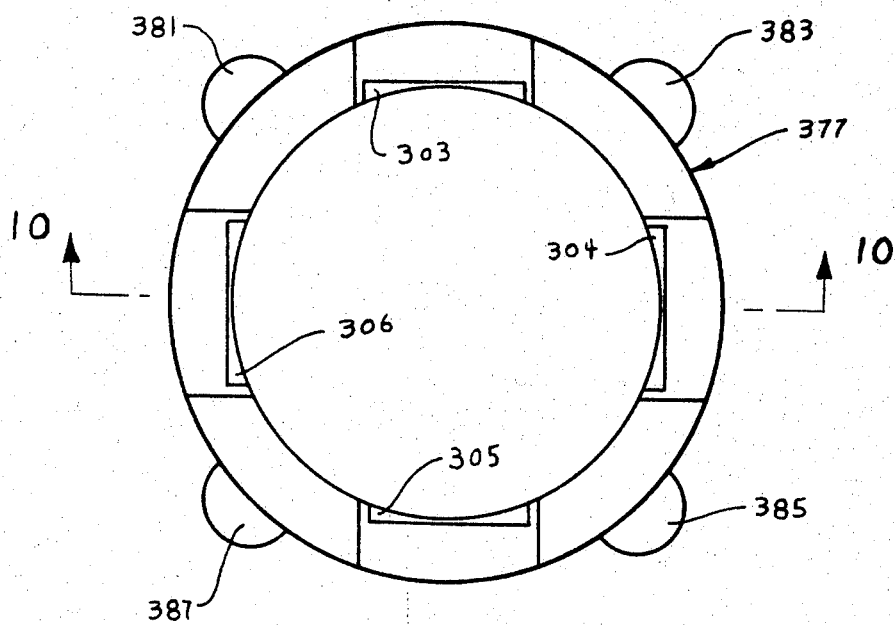
FIG. 9 is a side elevation of the pressure ring construction used with the third embodiment.
Figure 10:
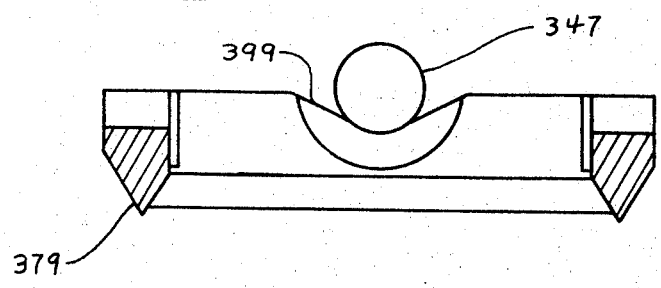
FIG. 10 is a sectional view taken along the line 10—10 in the direction of the arrows, FIG. 9, with a spider pin shown in position.

The third embodiment of the present invention, shown in FIGS. 8–10, utilizes pinion gears having a collar thereon. The pinion 363 shows the collar 301 which engages the inner portions of the pressure rings 375 and 377. This construction prevents chewing of the gears. The pressure rings are provided with cut-out portions 303, 304, 305, 306 which accommodate the pinion collars.

FIG. 10 shows the pressure ring which is provided with a cam surface 399 having a rounded seat. A round spider pin 347 is disposed in the cam surface seat. Thus, a rounded spider pin rather than a spider pin with flat cams is used.

It is to be understood that the pinion construction utilizing the collar 301 can also be used with the embodiments and modifications shown in FIGS. 1–7. Also a round spider pin could be utilized in these embodiments.

It will be noted that the present construction provides a double wedge effect. The first wedge effect is between the spider pins and the pressure rings, and the second wedge effect is between the pressure rings and the side gears. This provides a compound cone and avoids the normal tendency of a wedge or cone construction to stick.

The locking force is applied to the face of the gears rather than back of the gears. Thus, if there should be any spreading of the side gears away from the pinions during a turn when the gearing is actuated, it acts to move the side gears away from the pressure rings and aids in unlocking. This avoids any chattering on turns. Also, the side gear and pinion teeth engage near the axis of rotation of the differential, and this further discourages any tendency toward gear spread.

The fourth embodiment of the invention, shown, in FIGS. 11–14 of the drawings, includes the addition of a spider ring 404. Also, the female lock faces are provided on the pressure rings, and the male lock faces are provided on the lock rings.

Figure 11:
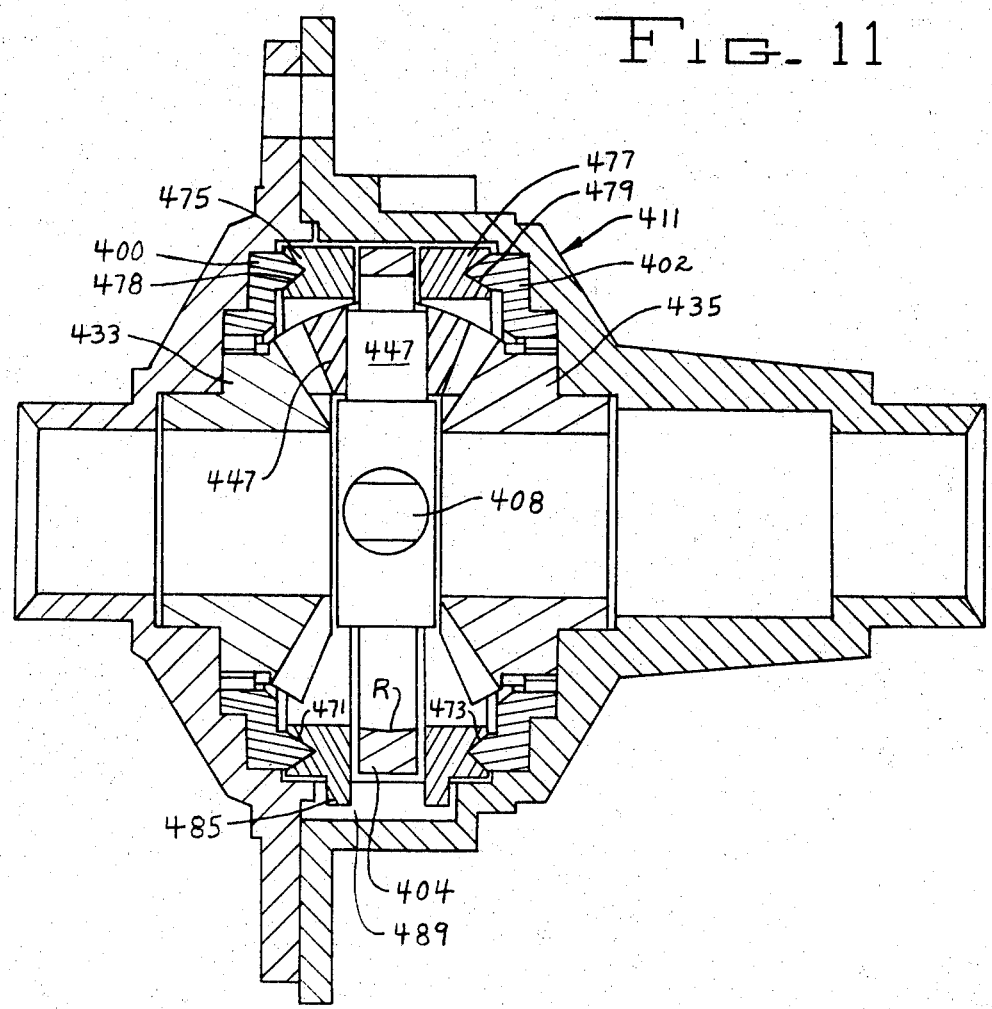
FIG. 11 is a rear mid-sectional elevation of a differential showing the fourth embodiment of the present invention.

This embodiment includes the case 411, the side gears 433 and 435, and four pinions 461, 463, 465 and 467. The spider in this instance includes the spider block 406 and the spider ring 404. The spider block includes four pins 445, 447, 449, and 451. Each of these pins has a nub 408 at the top thereof. This nub resembles a portion of a cylinder (FIGS. 11 and 13). Each nub 408 is seated in a recess 410 of similar curvature in the spider ring 404. The construction and fit are such that the nubs may move sidewise in the recesses, but no forward or back movement of the nubs in the recesses is permitted. This enables the spider block 406 to wobble laterally and accommodate any run out in the side gears and pinions. However, cam action of the spider ring is not affected, since the nubs 408 cannot move forward or back in the recesses 410.

Figure 12:
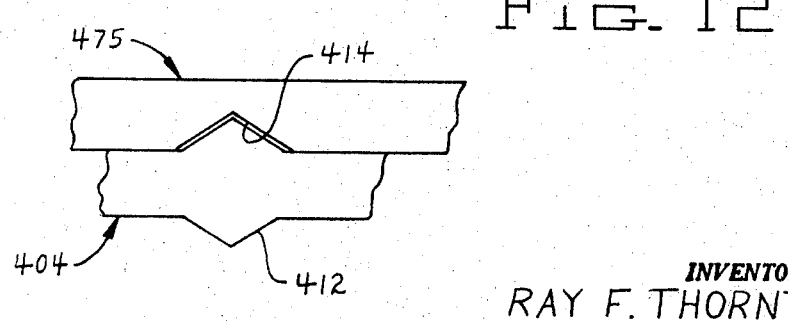
FIG. 12 is a fragmentary view of the spider ring and a locking ring used with the fourth embodiment.

The spider ring 404 has eight V-shaped male cams 412 on each side thereof. These cams are adapted to seat in female cams 414 in the pressure rings 475 and 477 (FIG. 12). The inside of the spider ring 404 is provided with a radius R to accommodate the crowns of the pinions.

The pressure rings 475 and 477 have lugs 481, 483, 485 and 487 which fit in lateral grooves 489 (FIG. 11) in the case 411. These lugs fit closely within the grooves. Thus, the pressure rings 475 and 477 are rotatable with the case 411 and can move transversely therein.

Lock rings 400 and 402 are positioned between the sides of the case 411 and the pressure rings 475 and 477. These lock rings are splined to the side gears 433 and 435. The lock rings are preferably formed of a material different than the case, such as aluminum bronze for example. Male locking surfaces 471 and 473, which are V-shaped in cross section, are formed on the lock rings 400 and 402. These locking surfaces engage the grooves 478 and 479 in the pressure rings 475 and 477.

Locking is accomplished when the case 411 is rotated by a power source. The case and pressure rings 475 and 477 engage the male cams 412 on the floating spider ring 404. This causes the pressure rings to spread apart and their female lock grooves 478 and 479 engage the male lock surfaces 471 and 473 on the lock rings 400 and 402. In this manner the side gears are locked with the case. When differential action occurs, one side gear is advanced by an outside source, such as a vehicle wheel on a road surface, and the spider is returned to a neutral or pressure-relief position. Unlocking is accomplished quickly and effectively.

If desired, a second male cam may be provided on the faces of the lock rings 400 and 402 opposite the cams 471 and 473. These second male cam faces can seat in female V-shaped grooves adjacent thereto in the case 411 or in additional plates constructed to rotate with the case. This provides multiple cone locking surfaces.

The word "spider" is used herein to denote a device which supports the pinion gears in a differential gear train. This word is used to cover a one piece device or a multiple piece assembly. For instance, the word includes an assembly such as the spider ring 404 and spider block 406 shown in FIG. 13 of the drawings as well as the single member 43 shown in FIG. 2 of the drawings.

In the claims, the term "side gear member" may be used. It is to be understood that this expression is meant to be generic to a unitary side gear such as shown in FIG. 1, a two piece side gear and locking ring assembly as shown in FIG. 7, or a side gear and anything which is rotatable with the side gear.

Having thus described my invention, I claim:

1. A differential power transmission for use with a power source, comprising a rotatable case; a floating spider disposed in said case, said spider being movable relative to the case about the axis of said case; pinions disposed on said spider; said gear members disposed on each side of said spider in mesh with said pinions and having locking grooves on the inside faces thereof; and spreadable pressure members rotatable with said case and having cam surfaces thereon in engagement with the spider; said pressure members spreading to engage the locking grooves in said side gear members in the locked condition of the device upon rotation of the case so that said pressure members exert a force against said floating spider through said cam surfaces; any gear spread force caused by rotation of said pinions and side gear members about their axes relieving the locking pressure between the pressure members and locking grooves.

2. A differential power transmission for use with a power source, comprising a rotatable case; a floating spider disposed in said case, said spider being movable relative to the case about the axis of said case; pinions disposed on said spider; a pair of side gear members one disposed on each side of said spider in mesh with said pinions, and having locking surfaces on the inside faces thereof; and spreadable pressure means rotatable with the case and disposed between the spider and the locking surfaces on said side gear members, said pressure means having cam surfaces in engagement with said spider; said spreadable pressure means spreading to engage the locking surfaces on the faces of said side gear members in the locked condition of the device upon rotation of the case so that said pressure means exert a force against said floating spider through said cam surfaces; any gear spread force caused by rotation of said pinions and side gear members about their axes relieving the locking pressure between the pressure means and locking surfaces.

3. A differential power transmission for use with a power source, comprising a rotatable case; a floating spider disposed in said case and having spider cam surfaces thereon, said spider being movable relative to the case about the axis of said case; pinions disposed on said spider; side gear members disposed on each side of said spider in toothed engagement with said pinions; a locking groove in the face of each side gear member; a pair of spreadable pressure rings, one disposed on each side of said spider adjacent a side gear member and rotatable with said case; a wedge on each of said pressure rings adjacent one of the side gear member grooves; cam surfaces on said pressure rings in engagement with said spider cam surfaces; and pressure relief passages at the base of said side gear member grooves said pressure rings spreading to engage the locking grooves in said side gear members in the locked condition of the device upon rotation of the case so that said pressure rings exert a force against said floating spider through said cam surfaces; any gear spread force caused by rotation of said pinions and side gear members about their axes relieving the locking pressure between the pressure members and locking grooves.

4. A differential power transmission for use with a power source, comprising a rotatable case; a pair of side gear members in said case; a locking groove in each side gear member near the outer edge on the inside face thereof; teeth on each said side gear member radially inward from said locking groove; a spider disposed between said side gear members, said spider being movable relative to the case about the axis of said case; pinions mounted on each spider and having gear teeth in mesh with the side gear member teeth; spider cam faces on said spider; a pair of pressure rings one disposed between each said side gear member and the spider, said pressure rings being disposed radially outward from said pinions; cam faces on said pressure rings in engagement with the cam faces on said spider; a wedge on each pressure ring adjacent the groove in the side gear member; and bosses on said pressure rings disposed in laterally positioned openings in the case so that said pressure rings are rotatable with said case and slidable laterally therein; said pressure rings moving to engage the locking grooves in said side gear members in the locked condition of the device upon rotation of the case so that said pressure rings exert a force against said floating spider through said cam faces; any gear spread force caused by rotation of said pinions and side gear members about their axes relieving the locking pressure between the pressure rings and locking grooves.

5. A differential power transmission for use with a power source, comprising a rotatable case; side gear members disposed in said case, each side gear member having a V-shaped groove therein on its inside face; a spider disposed between said side gear members and having pinions mounted thereon in meshed engagement with said side gear members, said spider being movable relative to the case about the axis of said case; cam faces on said spider; a pair of pressure rings one disposed between each of said side gear members and said spider, said pressure rings engaging said case for rotation therewith; cam faces on said pressure rings in engagement with the cam faces on said spider; and a wedge formed on each of said pressure rings adjacent the groove in the nearest side gear member; power from the power source causing the cam faces on said pressure rings to exert pressure against the cam faces on said spider to create a spread force in said pressure rings and move said wedges into pressure engagement with said side gear member grooves; rotation of one side gear member at a rate of rotation different than the case causing the cam faces on the spider to ease their engagement with the cam faces on the pressure rings and relieve the pressure between the pressure ring wedges and the side gear member grooves, and permitting differential action of the side gears and pinions; any gear spread force caused by rotation of said pinions and side gear members about their axes relieving the locking pressure between the pressure ring wedges and the side gear member grooves.

6. A differential power transmission for use with a power source, comprising a rotatable case; a pair of one-piece side gears disposed in said case, each side gear having a groove in the inside face thereof near the outer edge and having teeth radially inward from said groove; a spider disposed between said side gears and having pinions mounted thereon, said spider being movable relative to the case about the axis of said case and said pinions having teeth in engagement with said side gear teeth; cam faces on said spider; a pair of pressure rings one disposed between each of said side gears and said spider, said pressure rings engaging said case for rotation therewith; cam faces on said pressure rings in engagement with the cam faces on said spider; and a wedge formed on each of said pressure rings adjacent the groove in the nearest side gear; power from the power source causing the cam faces on said pressure rings to exert pressure against the cam faces on said spider to create a spread force in said pressure rings and move said wedges into pressure engagement with said side gear grooves; rotation of one side gear at a rate of rotation different than the case causing the cam faces on the spider to ease their engagement with the came faces on the pressure rings and relieve the pressure between the pressure ring wedges and the side gear grooves, permitting differential action of the side gears and pinions; any gear spread force caused by rotation of said pinions and side gears about their axes relieving the locking pressure between the pressure ring wedges and the side gear grooves.

7. A differential power transmission for use with a power source, comprising a rotatable case; a two piece side gear assembly disposed at each end of said case; said side gear assembly including a bevel side gear and a locking ring disposed over said side gear, said locking ring having a groove in the inside face thereof; a spider disposed between said side gear assemblies and having bevel pinions mounted thereon in mesh with said side gears, said spider being movable relative to the case about the axis of said case; cam faces on said spider; a pair of pressure rings one disposed between each of said side gear assemblies and said spider, said pressure rings engaging said case for rotation therewith; cam faces on said pressure rings in engagement with the cam faces on said spider; and a wedge formed on each of said pressure rings adjacent the groove in the nearest side gear locking ring; power from the power source causing the cam faces on said pressure rings to exert pressure against the cam faces on said spider to create a spread force in said pressure rings and move the wedges into pressure engagement with said locking ring grooves; rotation of one side gear at a rate of rotation different than the case causing the cam faces on the spider to ease their engagement with the cam faces on the pressure rings and relieve the pressure between the pressure ring wedges and the locking ring grooves, permitting differential action of the side gears and pinions; any gear spread force caused by rotation of said pinions and side gears about their axes relieving the locking pressure between the pressure ring wedges and the locking ring grooves.

8. A differential power transmission, comprising a rotatable case; a floating spider ring disposed in said case and having cam surfaces thereon, said spider ring being movable relative to the case about the axis of the case; a spider positioned adjacent said spider ring and having outwardly extending spider pins thereon; means on said spider ring to accommodate the said spider pins in a manner which permits lateral movement of said spider pins relative to said spider ring and prevents forward and back movement relative thereto; a plurality of pinions, one rotatably disposed on each spider pin; side gear members disposed on opposite sides of said spider ring in mesh with said pinions; spreadable pressure means adjacent said spider ring and having cam surfaces thereon in engagement with the cam surfaces on said spider ring, said pressure means being rotatable with said case; and locking surfaces associated with said pressure means for locking said side gear members against rotation relative to the case.

9. A differential power transmission, comprising a rotatable case; a floating spider ring disposed in said case and having cam surfaces thereon, said spider ring being movable relative to the case about the axis of said case, and having a plurality of transverse grooves spaced around the inner circumference; a spider positioned within said ring and having outwardly extending spider pins thereon, the ends of said spider pins being positioned in the transverse grooves in said spider ring so that the spider pins may move transversely of said ring; a plurality of pinions, one rotatably disposed on each spider pin; side gear members disposed on each side of said spider ring in mesh with said pinions; spreadable pressure members rotatable with said case and having cam surfaces thereon in engagement with the cam surfaces on said spider ring; and locking surfaces associated with said pressure members for locking said side gear members against rotation relative to the case, said locking surfaces being so positioned relative to the side gear members that any gear spread caused by rotation of said pinions and side gear members about their axes aids in relieving locking pressure on said locking surfaces.

10. A differential power transmission, comprising a rotatable case; a floating cam ring disposed in said case, said cam ring being movable relative to the case about the axis of the case; a plurality of cam surfaces extending sidewise from said cam ring; a spider positioned in said cam ring and having radially extending spider pins thereon; means on said cam ring to accommodate said spider pins in a manner which permits lateral movement of said spider pins relative to said spider ring and prevents forward and back movement relative thereto; a plurality of pinions, one rotatably disposed on each spider pin; side gear members disposed on opposite sides of said cam ring in mesh with said pinions; spreadable pressure means adjacent said cam ring and having cam surfaces thereon in engagement with the cam surfaces on said cam ring, said pressure means being rotatable with said case; and locking surfaces associated with said pressure means for locking said side gear members against rotation relative to the case.

11. In a mechanical locking differential for use with a power source, the combination of, a drive pinion; a differential assembly comprising, a ring gear positioned on said differential assembly in toothed engagement with said drive pinion, a differential case, a pair of side gears rotatably positioned in said differential case, a pair of pinion gears in toothed engagement with said side gears, a round differential pinion pin extending through said pinion gears; a first locking member positioned about the differential pinion pin intermediate the side gears with a second locking member positioned in alignment with said first locking member; the ends of the first of said locking members slidably positioned in a pair of openings in said differential case along the rotational axis thereof; cam means on each of said locking members adapted to cooperate with said round pinion pin; rotation of said round pinion pin within a plane perpendicular to the rotational axis of the differential case displacing each of said locking members to engage the face of each of said side gears to rotate both side gears in unison with the differential case.

12. In a differential for an automobile or the like, a driven differential case, a floating pinion shaft movable peripherally relative to the case, a pinion gear on said floating shaft, a side gear meshing with said pinion gear, the normal differential drive being from the case to the shaft to the pinions and hence to the side gears, a movable locking member located intermediate said floating pinion shaft and said side gear, means responsive to peripheral case-shaft movement for jamming said locking member between said floating pinion shaft and said side gear, thereby rendering said side gear and said pinion shaft co-rotatable, but disabling the normal case-shaft driving connection, the differential drive being locked with the case driving the side gear directly.

References Cited

UNITED STATES PATENTS 1,739,399 12/1929 Kavle _____ 192—107
1,324,860 12/1919 Taylor _____ 74—711 X

FOREIGN PATENTS 225,386 2/1959 Austrialia.

FRED C. MATTERN, Jr., *Primary Examiner.*
JAMES A. WONG, *Assistant Examiner.*